United States Patent
Rangaraian et al.

[11] Patent Number: 5,828,830
[45] Date of Patent: Oct. 27, 1998

[54] METHOD AND SYSTEM FOR PRIORTIZING AND FILTERING TRAPS FROM NETWORK DEVICES

[75] Inventors: Govindaraian Rangaraian, Sunnyvale; Mingyue Wang, Mountain View, both of Calif.

[73] Assignee: Sun Microsystems, Inc., Palo Alto, Calif.

[21] Appl. No.: 741,475

[22] Filed: Oct. 30, 1996

[51] Int. Cl.⁶ .................................................. G06F 11/00
[52] U.S. Cl. ................ 395/185.01; 395/607; 395/183.02
[58] Field of Search ......................... 395/185.01, 183.02, 395/182.02, 607, 200.05

[56] References Cited

U.S. PATENT DOCUMENTS

| | | | |
|---|---|---|---|
| 4,074,353 | 2/1978 | Woods et al. | 340/172.5 |
| 5,159,685 | 10/1992 | Kung | 395/183.02 |
| 5,388,189 | 2/1995 | Kung | 395/50 |
| 5,561,769 | 10/1996 | Kumar et al. | 395/200.05 |
| 5,630,123 | 5/1997 | Hogge | 395/607 |
| 5,651,006 | 7/1997 | Fujino et al. | 370/408 |

*Primary Examiner*—Ly Hua
*Attorney, Agent, or Firm*—Gary S. Williams; Flehr Hohbach Test Albritton & Herbert LLP

[57] ABSTRACT

Traps from network devices are filtered and prioritized. Filtering and prioritization can be performed on specific types of traps, traps from specific devices and traps from specific enterprises. Filtering is performed to reduce the number of traps that are processed, and prioritization is performed to indicate the relative importance of the traps. The filtering and prioritization can be performed by a trap daemon, which is executed by a network manager. Priorities and filters can be assigned to the traps, devices and enterprises by a network administrator. This provides the network administrator with great flexibility in managing the traps according to the situation at hand.

29 Claims, 8 Drawing Sheets

METHOD AND SYSTEM FOR PRIORTIZING AND FILTERING TRAPS FROM NETWORK DEVICES

The present invention relates generally to network management and particularly to trap processing.

BACKGROUND OF THE INVENTION

Today, large numbers of personal computers and workstations are being interconnected with file servers, print servers, modems, hubs and other devices to form local area networks, metropolitan area networks and wide area networks. These networks allow the personal computers and workstations to share information and valuable resources among each other. Now more than ever, individuals and companies depend on networks to conduct business and to communicate with people around the world. Indeed, the network has become the computer.

Networks that have centralized management use a network manager and some type of network management protocol such as Simple Network Management Protocol (SNMP). Among its management tasks, the network manager handles traps from agents of the devices on the network. A trap indicates the occurrence of a special event or a serious problem in a device. The network manager can correct a problem by commanding the device generating the trap to take a different course of action. Or, the network manager can sound an alarm, print out a report, display the status of the device or initiate some other kind of signaling action that notifies a network administrator of the problem. Having been notified, the network administrator has the problem corrected. For example, a printer runs out of paper and sends a trap to the network manager. The network manager commands the printer to use another paper tray. If that course of action does not work, the network manager notifies the network administrator that the paper tray is empty. The paper tray is filled and printing continues.

The problem is, networks can be very large, containing hundreds or thousands of devices. Not only do printer problems occur, but problems with other devices occur as well. And the problems can occur at the same time. Routers can go down, internal modem cards can be removed, network adapter cards can overheat, disk drives can become full, port tests can fail. The network administrator cannot respond to all of the problems simultaneously and at times the network administrator can be overwhelmed by a large number of alarms and reports.

Furthermore, the network administrator might not be able to identify and respond to the most important problems on the network. If the network manager treats all traps with the same urgency, a serious problem might be buried among many problems that are relatively trivial. The network administrator might be filling a printer tray with paper while an Ethernet adapter card is overheating. Serious damage could occur.

It is an object of the present invention to provide a method and system that efficiently manages traps from various network devices.

It is another object of the present invention to provide a network management method and system that handles traps from various network devices in accordance with a hierarchical priority and filtering scheme.

Other general and specific objects of this invention will be apparent and evident from the accompanying drawings and the following description.

SUMMARY OF THE INVENTION

The present invention pertains to a system and method for managing a network of devices. A network manager is connected to the network in order to monitor the activity of the various devices. The network manager utilizes a network management protocol to communicate with the devices. In the preferred embodiment, SNMP is the preferred network management protocol.

SNMP utilizes a query response model that has the network manager generate queries and has agents associated with the devices respond to the queries. In certain situations, an agent generates an unsolicited message or trap to notify the network manager of an event (e.g., fault). Each trap is associated with the device that initiated the trap and an enterprise that represents a grouping of devices associated with a particular vendor. Associated with each enterprise/device is a number of traps. Each associated trap is identified by a specified trap number that indicates the type of trap that was generated.

The network manager processes a trap in accordance with the trap's filter and priority. A trap configuration file is used to assign a trap filter and priority for each received trap. The trap configuration file specifies a datum representing a trap filter and priority for each device, for each device's specified trap number, for each enterprise, and for each enterprise's specified trap number. The values of the datum can represent a DISCARD filter, no filter, no priority, HIGH priority, MEDIUM priority, and LOW priority. There can be zero or more entries for each trap in the trap configuration file. A default trap filter and priority is used when no entry for a trap exists in the trap configuration file.

The network manager assigns a trap filter and priority for each trap in accordance with a prescribed selection criteria which is as follows: (1) first, the trap filter and priority corresponding to the trap's host and specified trap number is selected; (2) second, the trap filter and priority corresponding to the trap's host is selected; (3) third, the trap filter and priority corresponding to the trap's enterprise and specified trap number is selected; (4) fourth, the trap filter and priority corresponding to the trap's enterprise is selected; and (5) lastly, the default trap filter and priority is used.

The network manager processes a trap based on the trap's filter and priority. Those trap's having the filter of DISCARD are ignored while those having the priority HIGH, MEDIUM, or LOW are processed accordingly. The trap configuration file is dynamic and can be altered at various times in order to efficiently respond to the network's ongoing activities.

BRIEF DESCRIPTION OF THE DRAWINGS

Additional objects and features of the invention will be more readily apparent from the following detailed description and appended claims when taken in conjunction with the drawings, in which:

DETAILED DESCRIPTION OF THE INVENTION

Figure 1:
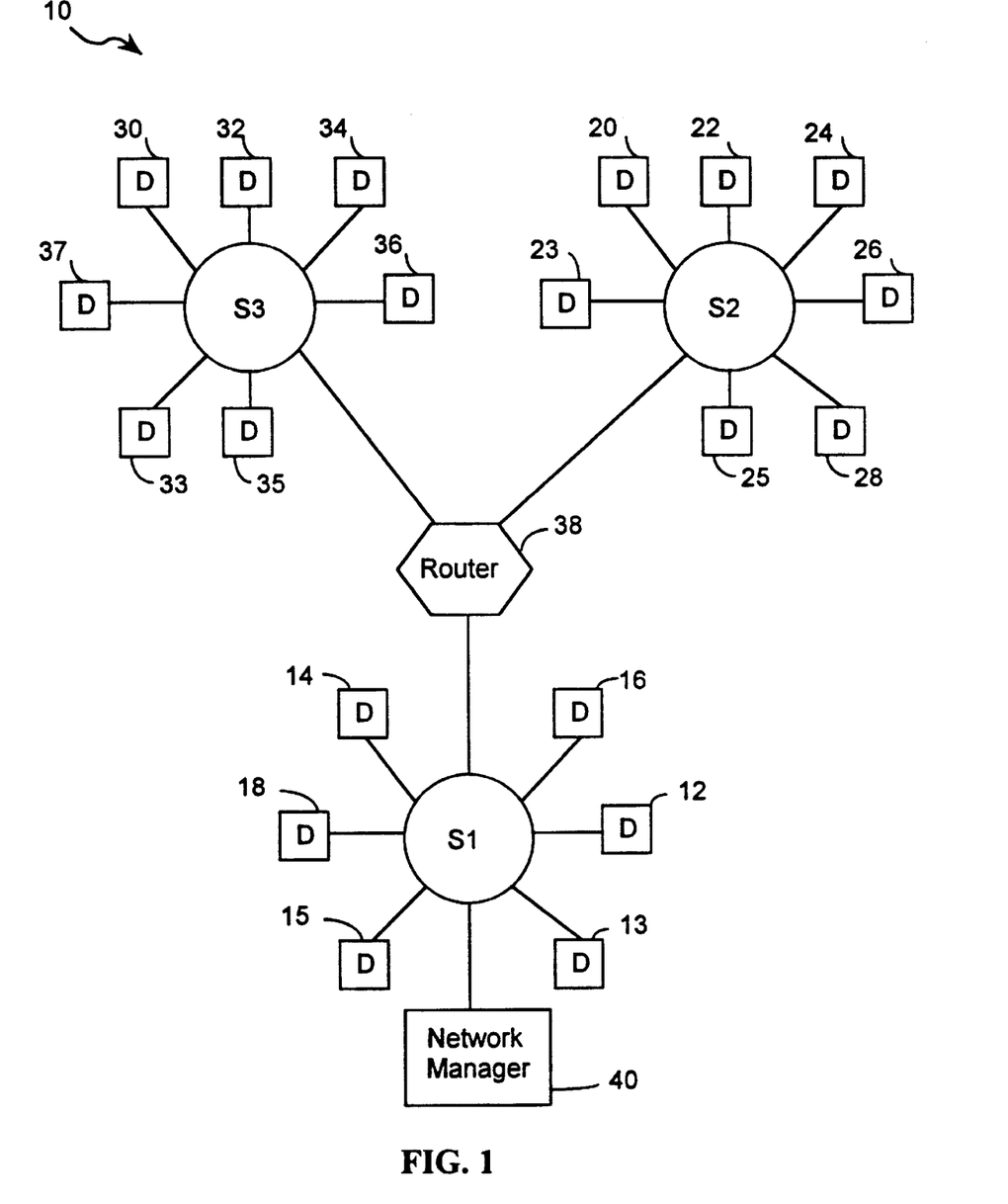
FIG. 1 is a schematic diagram of a network including a network manager according to the present invention.

FIG. 1 shows a network 10 which, for illustrative purposes, includes a first, second and third subnetwork (hereinafter referred to as subnets) S1, S2 and S3. The subnets S1, S2 and S3 can have the same topology or they can have different topologies. The topologies include, but are not limited to, Token ring, Ethernet, X.25 and FDDI. Devices 12, 13, 14, 15, 16 and 18 are connected to the first subnet S1; devices 20, 22, 23, 24, 25, 26 and 28 are connected to the second subnet S2; and devices 30, 32, 33, 34, 35, 36, and 37 are connected to the third subnet S3. The devices or hosts 12–37 can be workstations, personal computers, hubs, printers, network adapters, multiplexers, etc. It should be noted that for the purposes of this document, the terms "hosts" and "devices" are used interchangeably. An additional device 38, preferably a router, interconnects the first, second and third subnets S1, S2 and S3. The network 10 is scalable, which allows computing resources to be added as needed. Although only a small number of devices 12–38 is shown, the network 10 can encompass tens of addressable devices up to tens of thousands of addressable devices.

Each device 12–38 has a physical address and a unique Internet protocol (IP) address. UDP/IP is the preferred protocols that regulates how data is packeted into IP packets and transported between the devices 12–38.

The network 10 also includes a network manager 40 that is connected to the first subnet S1. Simple Network Management Protocol (SNMP) is used by the network manager 40 for managing the devices 12–38 that support SNMP. The devices 12–38 that do not support SNMP can be managed by a protocol such as Internet Control Message Protocol (ICMP). Each SNMP-manageable device stores a Management Information Base (MIB) in its memory. The MIB is a collection of objects or variables representing different aspects of the device (e.g., configuration, statistics, status, control). Each SNMP-manageable device is associated with an agent, which is a software procedure that may or may not be resident in the device. The agents monitor their associated MIBs and send out traps whenever certain conditions occur. The agents also allow the network manager 40 to access the MIB of each SNMP-manageable device. Through an agent, the network manager 40 can read values of variables from a MIB, and it can change values of variables in the MIB. Such accessibility allows the network manager 40 to perform its management tasks. For a general description of network management and SNMP, see W. Stallings, *SNMP, SNMPv2 and RMON,* 2d ed., Addison-Wesley Publishing Co., (1996), which is incorporated herein by reference.

When an agent sends out a trap on the network 10, the network manager 40, receives, filters and prioritizes the trap, and then notifies a network administrator of the trap. Filtering and prioritization can be performed on specific types of traps, traps from specific devices and traps from specific enterprises. Filtering is performed to reduce the number of traps that have to be processed, and prioritization is performed to indicate the relative importance of the traps to the network administrator. The network manager 40 provides the network administrator with great flexibility in identifying important problems on the network 10 and responding to the situation at hand. Such flexibility allows the network administrator to manage large numbers of traps in an easy, efficient and intelligent manner.

Figure 2:
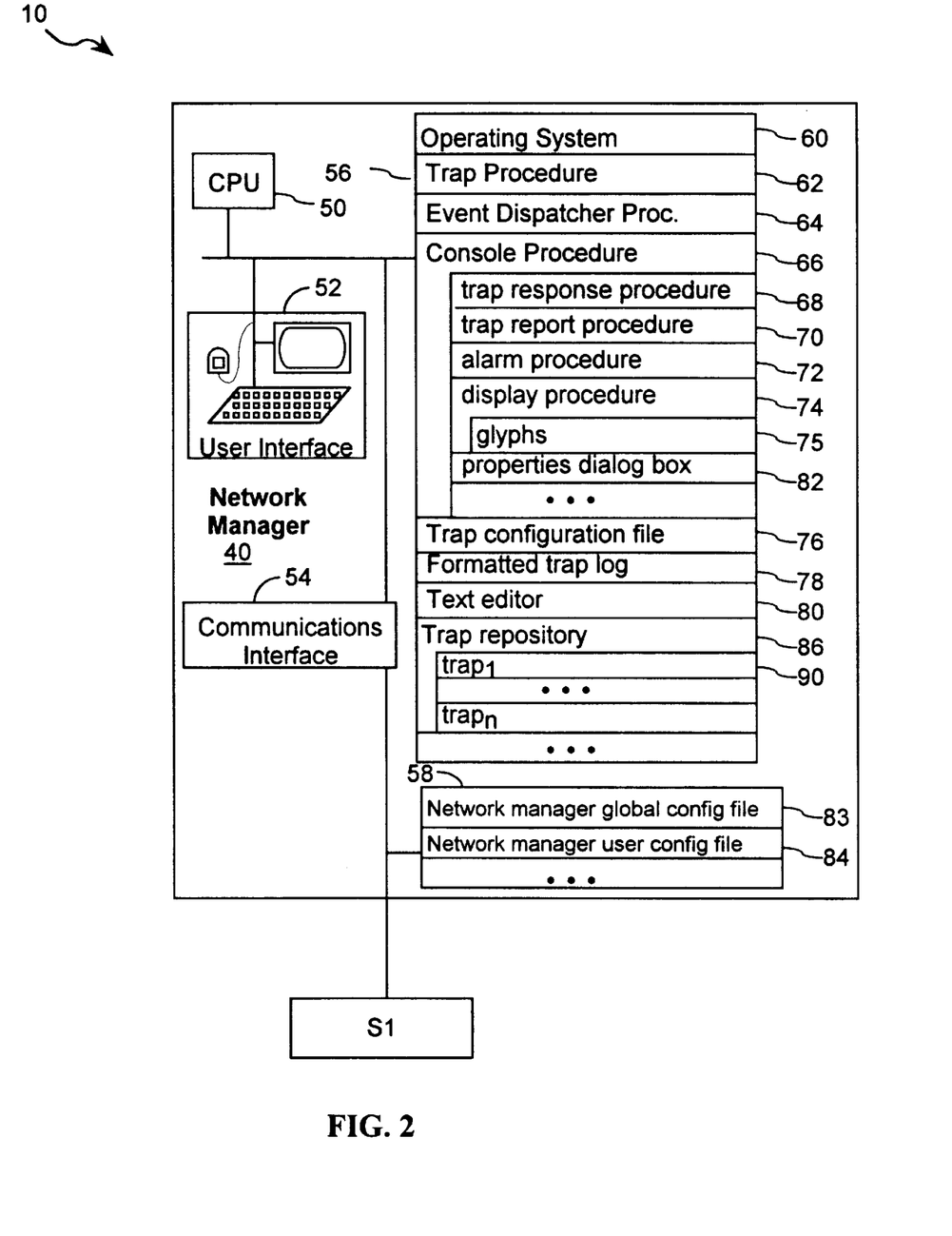
FIG. 2 is a block diagram of the network manager according to a preferred embodiment of the present invention.

FIG. 2 illustrates the network manager 40 in greater detail. The network manager 40 can be a personal computer or workstation. The network manager 40 includes a central processing unit (CPU) 50, a user interface 52, a communication interface 54, a primary memory 56 and a secondary storage 58. The user interface can consist of a keyboard, mouse, color display, and/or other type of input/output device that can be used to interface with the network manager. A network administrator utilizes any one of the user interfaces to interact with the network manager. The communications interface 54 is used to communicate with one or more subnets S1. The secondary memory 58 can be any type of non-volatile storage including but not limited to magnetic disk storage.

The primary memory of the network manager 40 can contain the following:
- an operating system 60;
- a trap procedure 62 that responds to traps initiated from devices connected to the network 10;
- an event dispatcher procedure 64 that distributes received traps to other procedures and applications;
- a console procedure 66 that provides visual and audio notification of the traps to the network administrator or other users;
- a trap configuration file 76 that specifies a filter and priority for one or more of the various devices;
- a formatted trap log 78 that stores one or more formatted traps received by the Event Dispatcher procedure 64;
- a text editor 80 for modifying information in one or more files;
- a trap repository 86 including one or more received raw traps 90;
- as well as other procedures and data structures.

The console procedure 66 can include the following:
- a trap response procedure 68 that responds to received traps without utilizing the network administrator;
- a trap report procedure 70 that generates and sends a trap report including various information pertaining to a trap to a network administrator or a peripheral device;
- an alarm procedure 72 that generates audio notification of a trap;
- a display procedure 74 that provides visual notification of outstanding traps, the display procedure 74 can include one or more glyphs 75 that are used to represent each device;
- a properties dialog box 82;
- as well as other procedures and data structures.

The secondary storage 58 contains a network manager global configuration file 83 that stores configuration information pertaining to the network including default trap configurations for all the devices and a network manager user configuration file 84 that stores configuration information that is specific to each user.

Figure 3:
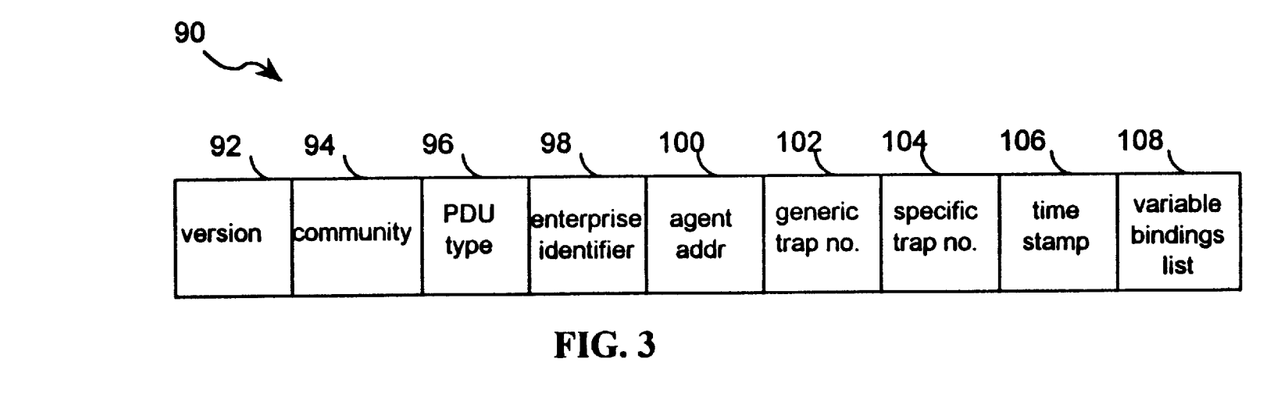
FIG. 3 illustrates a preferred format of a trap in accordance with a preferred embodiment of the present invention.

FIG. 3 illustrates the preferred format of a trap. According to RFC 1157 (A Simple Network Management Protocol, 1990), each trap 90 includes the following fields:
- a version field 92 that indicates the version of SNMP;
- a community field 94 that identifies a community name that is to be used for the exchange;
- a protocol data unit (PDU) type 96 that indicates that this is a trap PDU;

an enterprise identifier 98 that indicates the enterprise that generated the trap;

an agent address 100 that is the address of the device generating the trap;

a generic trap number 102 that indicates one of the predefined generic trap types;

a specific trap number 104 that indicates one of the specific trap types;

a time stamp 106 that indicates the time that the trap was generated; and a variable bindings list 108 that includes the MIB attributes that are carried in the trap message.

Figure 4:
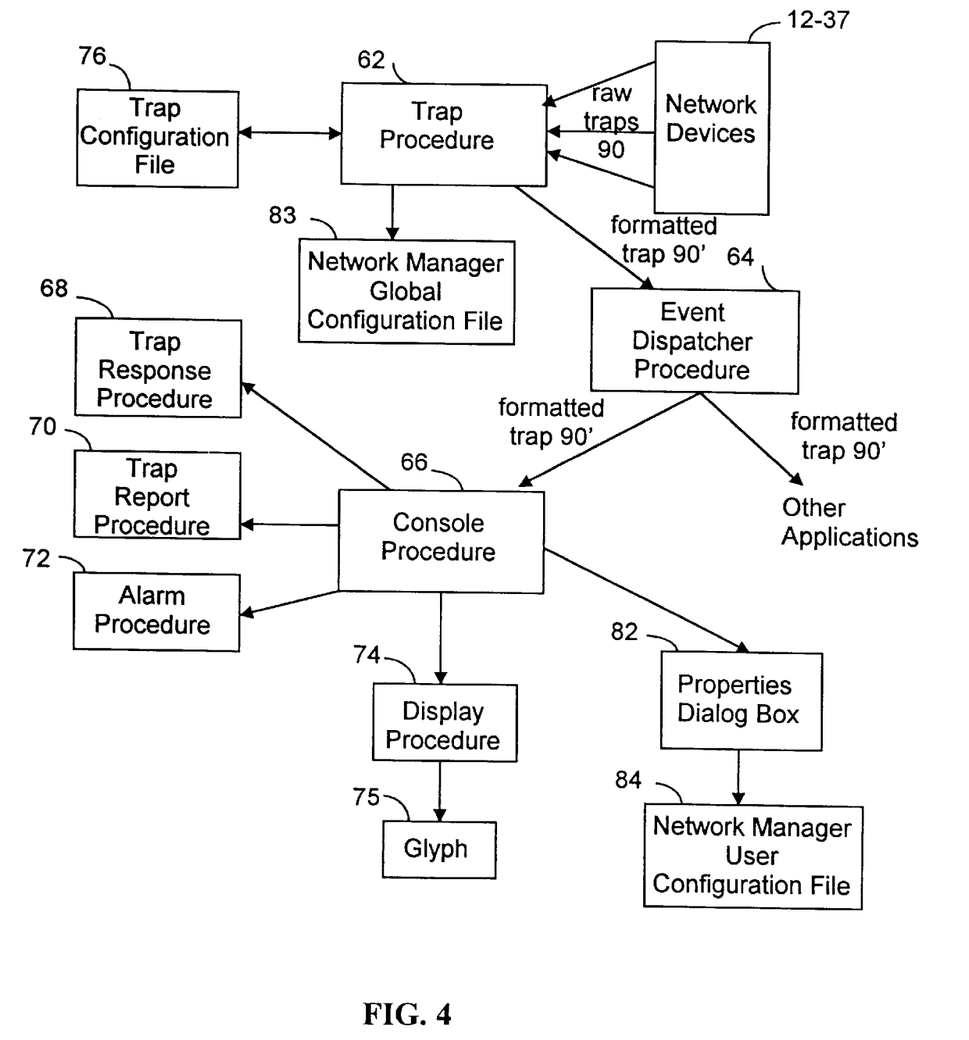
FIG. 4 is a block diagram of the processing modules that are used to process a trap in a preferred embodiment of the present invention.

FIG. 4 shows the relationship between the main procedures of the network manager 40. The Trap procedure 62 is executed as a background daemon and receives one or more raw traps 90 from one or more of the network devices 12–38. As soon as a raw trap 90 is received, the Trap procedure 62 examines a trap configuration file 76 to determine the type of filter that is to be assigned to the raw trap 90. If, for example, a DISCARD filter is applied, the Trap procedure 62 does not forward the raw trap 90 to the Event Dispatcher procedure 64. If no filter is specified in the trap configuration file 76, default conditions are applied. By default, the raw trap 90 is not discarded.

If not discarded, the raw trap 90 is assigned a priority. The priority of the raw trap 90 is also indicated in the trap configuration file 76. For example, a priority such as: HIGH, MEDIUM or LOW could be assigned to the raw trap 90. The Trap procedure 62 then places the raw trap 90 in a specific format (e.g., rearranges or selects specific fields) and forwards the formatted trap 90' to the Event Dispatcher procedure 64.

The Event Dispatcher procedure 64 keeps a log of the formatted traps 78 (see FIG. 2). The log 78 can be displayed by the Console procedure 66 to allow the network administrator to see the generated traps. The Event Dispatcher procedure 64 forwards the formatted traps 90' to other applications, including the Console program 66.

The Console procedure 66 includes an object-oriented, graphical user interface (GUI). The GUI can be derived from OpenWindows™ 3.1 or later or any other library of classes for GUIs. The Console procedure 66 is interrupt-driven. That is, it performs operations in response to a series of interrupts. The interrupts can be supplied by a mouse or keyboard during the selection of menu items and they can be supplied by the Event Dispatcher procedure 64 when it is ready to forward the formatted traps 90'.

The Console procedure 66 has a Trap Response procedure 68, that allows the network manager 40 to correct a problem without intervention by the network administrator. The Trap Response procedure 68 can forward the trap 90' to a procedure that changes the value of a variable in the MIB of the device generating the trap. The value could be changed by issuing a SetRequest message to the agent of the device. Or, the Trap Response procedure 68 can forward the trap 90' to an application or perform visual signaling actions such as blinking or placing the device generating the trap in a "Pending" state. While a device is in a Pending state, the console procedure 66 receives, but does not process, the traps for that device. For a description of the Pending state and the apparatus and method of placing a device in a Pending state, see U.S. Ser. No. 08/661,581 filed Jun. 4, 1996, which is assigned to the assignee of the present invention and incorporated herein by reference.

The Console procedure 66 also includes a Trap Report procedure 70, that generates a trap report and sends the trap report to a display or printer, or to the network administrator (via e-mail). The trap report, which provides one form of notification to the network administrator, can indicate the priority of the trap, the device generating the trap, and trap attributes including trap type (either generic or enterprise) trap number, and trap name (a user-specified or default string).

The Console procedure 66 includes an Alarm procedure 72, that provides audio notification to the network administrator when a trap has occurred. For example, the Alarm procedure 72 can play a sound file of a bell, whistle or voice notifying the network administrator of a trap 90'. The voice can even identify the type and priority of the trap 90'.

The Console procedure 66 includes a Display procedure 74 that provides additional visual notification as to whether any traps 60 are outstanding. The Display procedure 74 displays views of the devices in a hierarchy, and it allows the network administrator to navigate through various levels of the hierarchy. The Display procedure 74 represents the devices 12–38 with glyphs 75. Glyphs 75 are icons that have attributes such as color and brightness. The glyphs 75 are color-coded to notify the network administrator of traps that are outstanding. For example, a yellow color could indicate that a LOW priority trap is outstanding; an orange color could indicate a MEDIUM priority trap; and a red color could indicate a HIGH priority trap. The colors are displayed in an order of precedence: the highest priority trap color takes precedence. If a device has generated both a HIGH priority trap and a MEDIUM priority trap, its glyph 75 will display only the color (i.e., red) used to indicate HIGH priority. A glyph 75 could be colored green to indicate that no traps for its corresponding device are outstanding.

The Console procedure 66 displays a menu bar which includes a menu item for a Properties popup dialog box 82. When the Properties dialog box 82 is selected, it displays a box showing the selected color for each priority. The priority scheme (e.g., HIGH, MEDIUM, LOW) is hard-wired into the network manager 40 and cannot be changed by the network administrator. However, the network administrator has the flexibility to associate different colors with the different priorities. For example, the network administrator could associate a violet color with a HIGH priority, a blue color for a MEDIUM priority and a gray color for a LOW priority. The color assignments are saved in a network manager user specific configuration file 84.

The network administrator is also allowed to select default conditions for the filter and priority through the text editor 80. If a filter or priority is not assigned in the trap configuration file 76, the default conditions (e.g., no filter, LOW priority) are applied. The default conditions are saved in the network manager global configuration file 83. In addition, the network administrator can modify the trap configuration file 76 through the use of the text editor 80.

Figure 5:
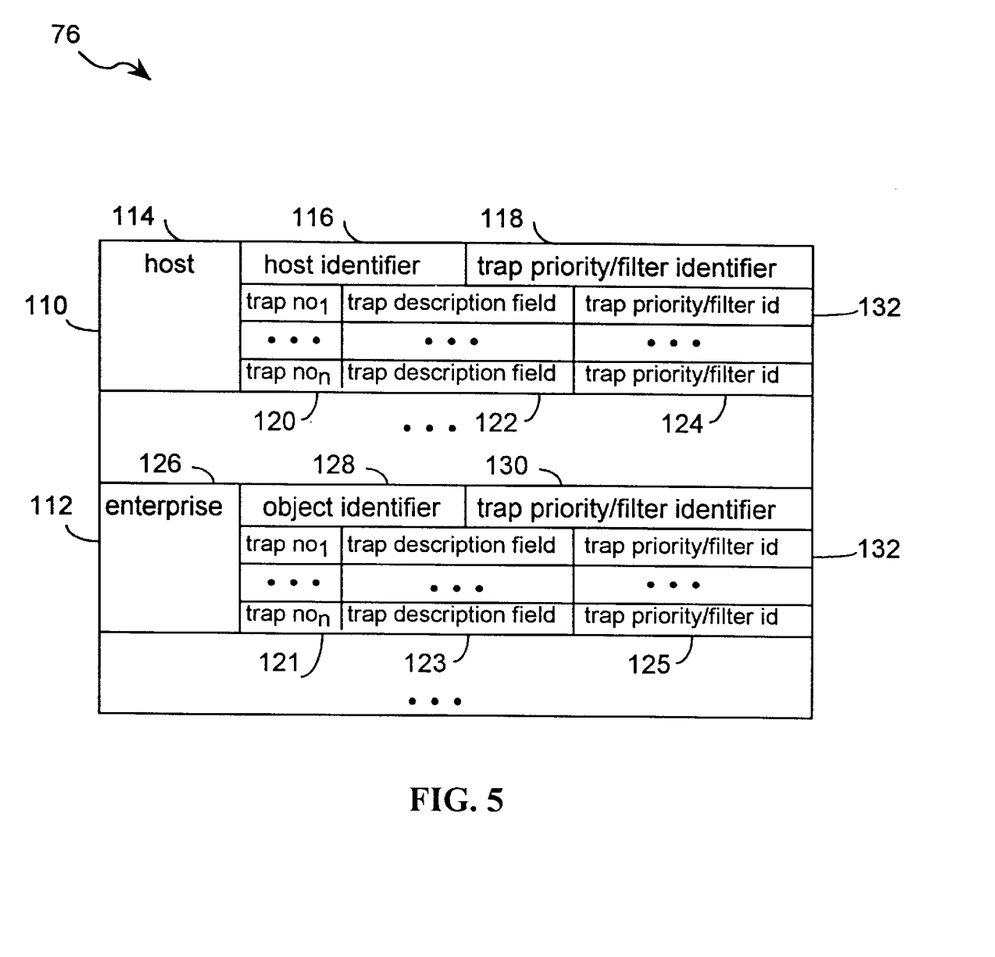
FIG. 5 is a format of the trap configuration file of a preferred embodiment of the present invention.

FIG. 5 illustrates the preferred format for the trap configuration file 76. The trap configuration file 76 can contain entries for each host and each enterprise associated with the network 10. An enterprise is a grouping of devices associated with a particular vendor. The file 76 can have a host entry 110 for one or more hosts or devices in the network 10. A host entry 110 can contain a host field that contains the term "host" 114, a host identifier 116, and a trap priority/filter identifier 118. The host identifier 116 can be the IP address associated with the host or a name that identifies the host. Each host entry 110 can include zero or more trap entries 132. Each trap entry 132 is associated with a specific trap and can include a trap number 120, a trap description field 122, and a trap priority/filter identifier 124. The trap priority/filter identifier 124 can include filters such as DISCARD, or priorities such as LOW, MEDIUM, and HIGH. A filter of DISCARD indicates no priority and priorities such as LOW, MEDIUM, and HIGH indicate no filter.

The trap configuration file 76 can also include enterprise entries for one or more enterprises in the network 10. An enterprise entry 112 can contain an enterprise field that contains the term "enterprise" 126, an object identifier 128 and a trap priority/filter identifier 130. The object identifier 128 identifiers a particular enterprise, and the trap priority/filter identifier 130 identifies a trap filter and priority associated with the particular enterprise. An enterprise entry can include zero or more trap entries 132. Each trap entry 132 is associated with a specific trap and can include a trap number 121, a trap description field 123, and a trap priority/filter identifier 125.

It should be noted that for all trap priority/filter identifiers 118, 124, 125, 130, when the filter for the trap is not the DISCARD filter, the selected filter is "no filter." In other words, whenever a trap has a priority of LOW, MEDIUM, or HIGH, the applicable trap filter is "no filter." Similarly, whenever a trap is assigned the DISCARD filter, its assigned trap priority is "no priority."

The network administrator has the flexibility to filter and prioritize raw traps 60 according to specific hosts. For instance, the network 10 can be configured to have five additional routers 12, 16, 20, 22 and 24 in addition to the first router 38. However, only the first router 38 is deemed important at the time by the network administrator. Using the text editor 80, the network administrator makes certain entries in the trap configuration file 76. Each entry includes the keyword host, followed by a host name or IP address, and a filter or priority. Exemplary entries in the trap configuration file 76 might include:

| host | 129.146.74.165 | DISCARD |
|------|----------------|---------|
| host | First_Router | HIGH |

The first router 38 is identified by the host name First_Router. The IP address 129.146.74.165 corresponds to one of the five routers in the example above. The first router 38 is assigned a HIGH priority and one of the other five routers is assigned the DISCARD filter in the trap configuration file 76. All traps 90 generated by the 129.146.74.165 router are discarded; all traps 90 generated by the first router 38 are indicated as high priority.

Perhaps not all traps 90 are important to the first router 38. For example, the network administrator might not want to assign a HIGH priority to traps 90 indicating low and medium temperatures. A DISCARD filter for traps 90 indicating a low temperature and a MEDIUM priority for traps 90 indicating a normal temperature might be more appropriate. The network administrator overrides the priority assigned to the first router 38 by making additional entries in the trap configuration file 76. Each additional entry includes a trap number 120, followed by a trap description field 122 and a trap priority/filter 124. The additional entries for the first router 38 might be as follows:

| host | First Router | HIGH |
|------|--------------|------|
| 6 | TEMP_NORMAL | MEDIUM |
| 10 | TEMP_LOW | DISCARD |

All traps 90 from the first router 38 are assigned a HIGH priority, except for traps 90 indicating low and normal temperatures. A trap 90 indicating normal temperature would be assigned a MEDIUM priority, and a trap 90 indicating low temperature would be discarded.

The network administrator also has the flexibility to filter and prioritize the raw traps 90 according to specific enterprises (i.e., classes of devices). Each vendor has its own specific traps 90 for its devices. For example, trap no. 10 for a device from Sun Microsystems might identify a different type of trap than trap no. 10 for the same class of device from another vendor. The network administrator can filter and prioritize traps 90 for specific enterprises by making an entry including an enterprise keyword followed by an Object Identifier 128 and a filter or priority. Exemplary entries in the trap configuration file 76 might include:

| enterprise | 1.3.6.1.4.1.75 | DISCARD |
|------------|----------------|---------|
| enterprise | 1.3.6.1.4.1.89 | LOW |

Thus, all traps 90 from the class of devices identified by the Object Identifier 1.3.6.1.4.1.75 will be discarded; all traps 90 from the class of devices identified by the Object Identifier 1.3.6.1.4.1.89 will be assigned a LOW priority.

As with the entries for the hosts, priorities and filters for specific traps 90 from an enterprise can be overridden. For the enterprise identified by Object Identifier 1.3.6.1.4.1.75, the entries

| enterprise | 1.3.6.1.4.1.75 | DISCARD |
|------------|----------------|---------|
| 4 | TEMP-HIGH | HIGH | will cause all traps for the enterprise 1.3.6.1.4.1.75 to be discarded, except for the trap (no. 4) indicating a high temperature. That trap will be assigned a HIGH priority.

Figure 6:
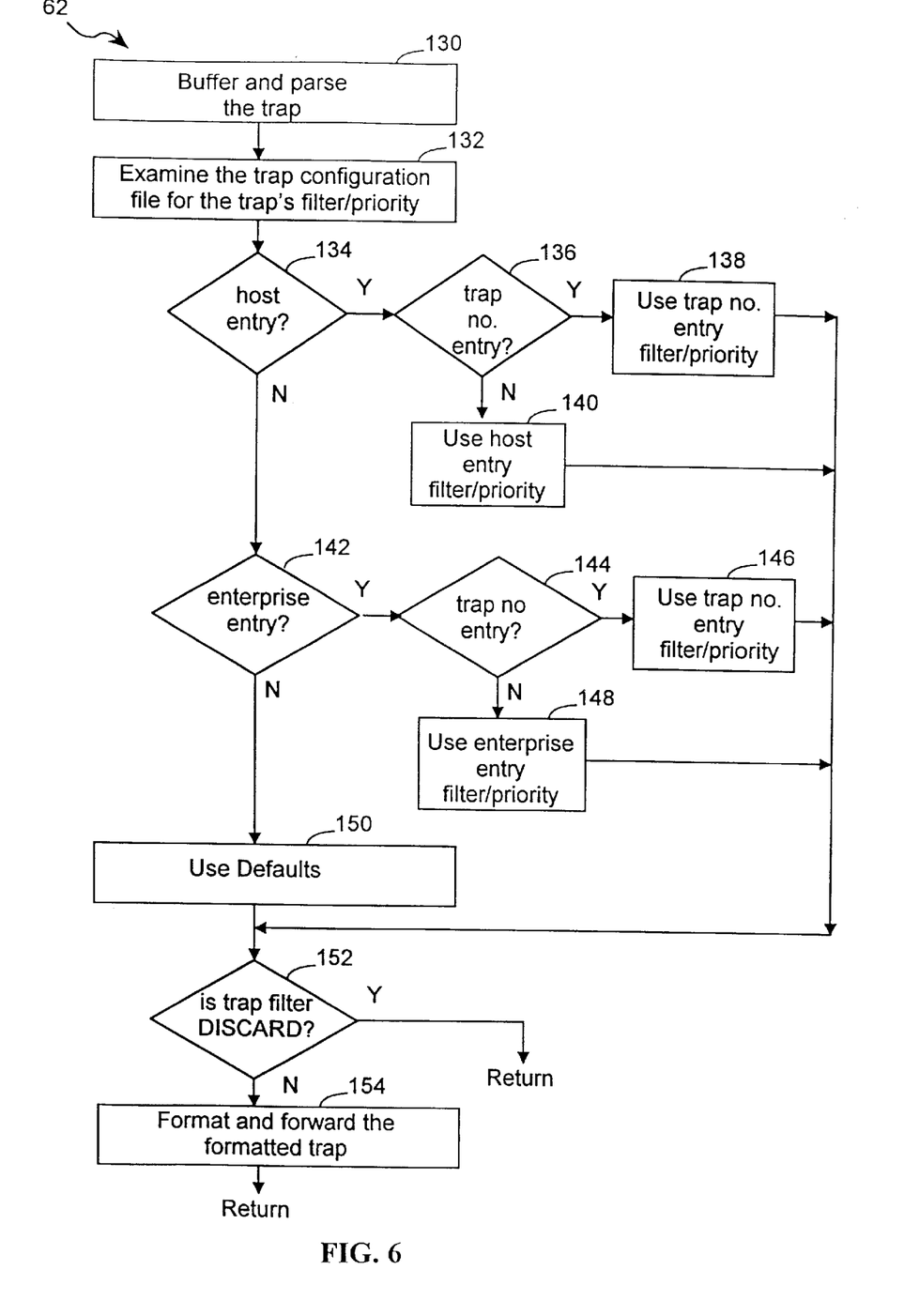
FIG. 6 is a flowchart of the steps performed by the Trap procedure shown in FIG. 4.

Reference is now made to FIG. 6, which shows steps performed by the Trap procedure 62 upon receipt of a raw trap 90 from a network device. The trap procedure 62 selects the associated filter and priority for a raw trap in accordance with a particular priority scheme. The configuration file is searched first for a filter/priority 124 associated with the received trap's host and specified trap number. If the received trap's specified trap number and host are not listed in the trap configuration file 76, the filter/priority 118 corresponding to the received trap's host is used, if listed in the file 76. If the configuration file 76 does not have an entry for the received trap's host, the trap procedure then searches for an enterprise entry that is associated with the received trap. If such an entry exists, the filter/priority 125 associated with the specified trap number is selected first. If none exists, the enterprises's filter/priority 130 is used. Lastly, if the trap configuration file does not contain an entry for the received trap's enterprise or host, default conditions are used.

The Trap procedure 62 buffers and parses the raw trap 90 (step 130). The Trap procedure 62 examines the trap configuration file 76 (step 132) and searches for the associated filter/priority for the raw trap 90. The trap procedure 62 searches for a host entry 110 in the trap configuration file 76 that contains a host identifier 116 that matches the agent address field 100 in the received raw trap 90 (step 134). If such a match is found (step 134-Y), the trap entries 132 associated with the matched host entry are searched further for the trap number 104 specified in the raw trap 90 (step 136). If a match is found (step 136-Y), the value of the trap priority/filter id field 124 is used (step 138). Otherwise, the value of the trap priority/filter id field 118 associated with the host entry is used (step 140).

If no entry exists in the trap configuration file for the received trap's host (step 134-N), the trap procedure 62 searches for a matching entry based on the received trap's enterprise identifier 98 (step 142). If a matching entry exists (step 142-Y), a further search is made for a trap entry 132 corresponding to the received trap's specified trap number 104. If such a trap entry exists (step 144-Y), the filter/priority 125 contained in the matching trap entry is used (step 146). Otherwise (step 144-N), the enterprise's filter/priority 130 is used (step 148).

If the enterprise or host associated with a received trap 90 does not have a corresponding entry in the trap configuration file, the default conditions are used (step 150). These are obtained from the network manager global configuration file 83.

Next, a check is made to determine if the filter is DISCARD (step 152). If so (step 152-Y), the Trap procedure 62 returns without performing any further processing. Otherwise, the raw trap 90 is formatted in accordance with a specified format and forwarded to the Event Dispatcher 64 for further processing (step 154).

Consider the following trap configuration file:

| enterprise | 1.3.6.1.4.1.75 | DISCARD |
|---|---|---|
| 4 | TEMP-HIGH | HIGH |
| host | 129.146.74.165 | HIGH |
| 10 | TEMP-LOW | LOW |
| host | arcade | DISCARD | and assume that the enterprise covers a class of routers and also assume that both hosts are routers in that class. The Trap procedure 62 will indicate all traps from the host having IP address 129.146.74.165 as HIGH priority, except for trap 10 (which will be indicated as LOW priority); and it will discard all traps from the host having the host name "arcade." The Trap procedure 62 will discard the traps for all of the routers in the enterprise identified by Object Identifier 1.3.6.1.4.1.75, except for traps indicating high temperature and the traps from the host at IP address 129.146.74.165. However, high temperature traps from the host "arcade" will also be discarded.

Figure 7:
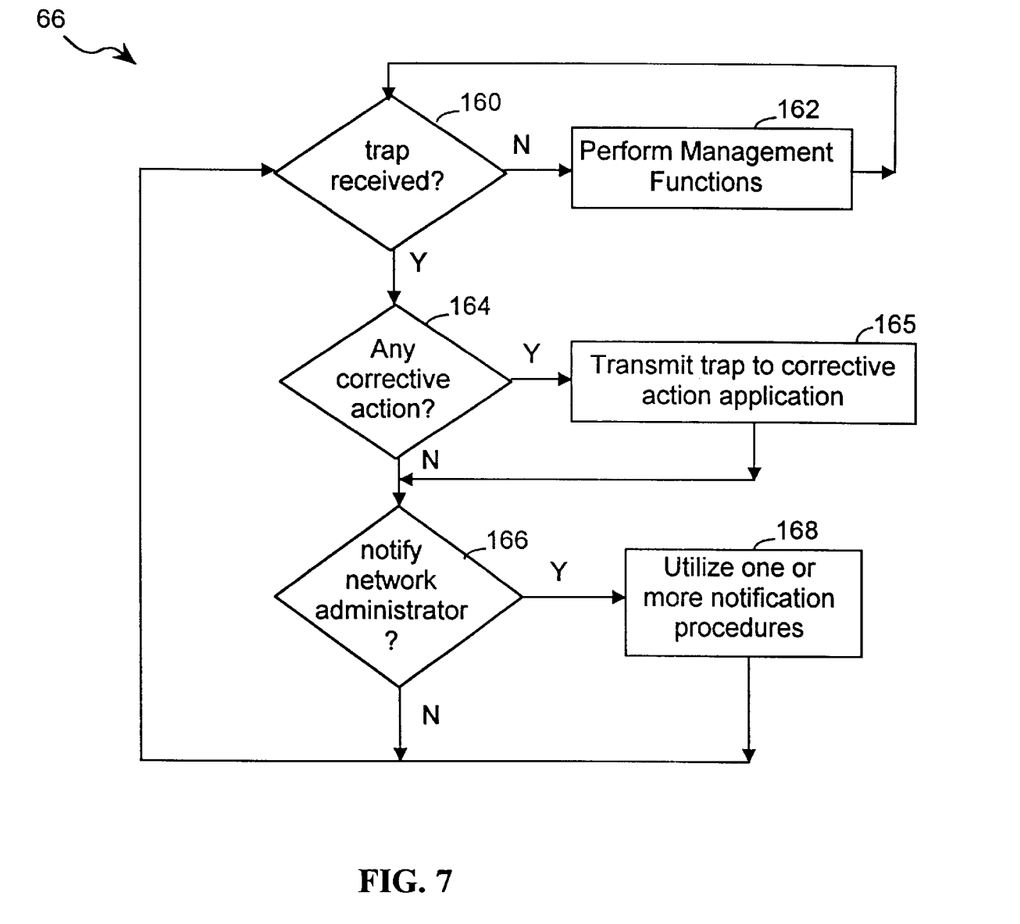
FIG. 7 is a flowchart of steps performed by the Console procedure shown in FIG. 4.

Reference is now made to FIG. 7, which shows the steps performed by the Console procedure 66 upon receipt of a trap 90 from the Event Dispatcher procedure 64 (step 160). The Console procedure 66 determines if any corrective action is necessary (step 164). If corrective action is necessary, the console procedure 66 sends the trap 90 to an application, if any, that takes a corrective action such as changing a value of a MIB variable for the device (step 165). Next, the Console procedure 66 determines whether the network administrator is to be notified of the trap (step 166). If notification is to be performed, the Console procedure 66 notifies the network administrator of the trap by initiating one or more of the following functions: a signaling action, such as sounding an alarm, printing out a trap report, and/or color-coding the glyph of the device (step 168). When a trap is not received (step 160-N), the Console procedure 66 performs its other management functions (step 162) until another trap is received.

Figure 8:
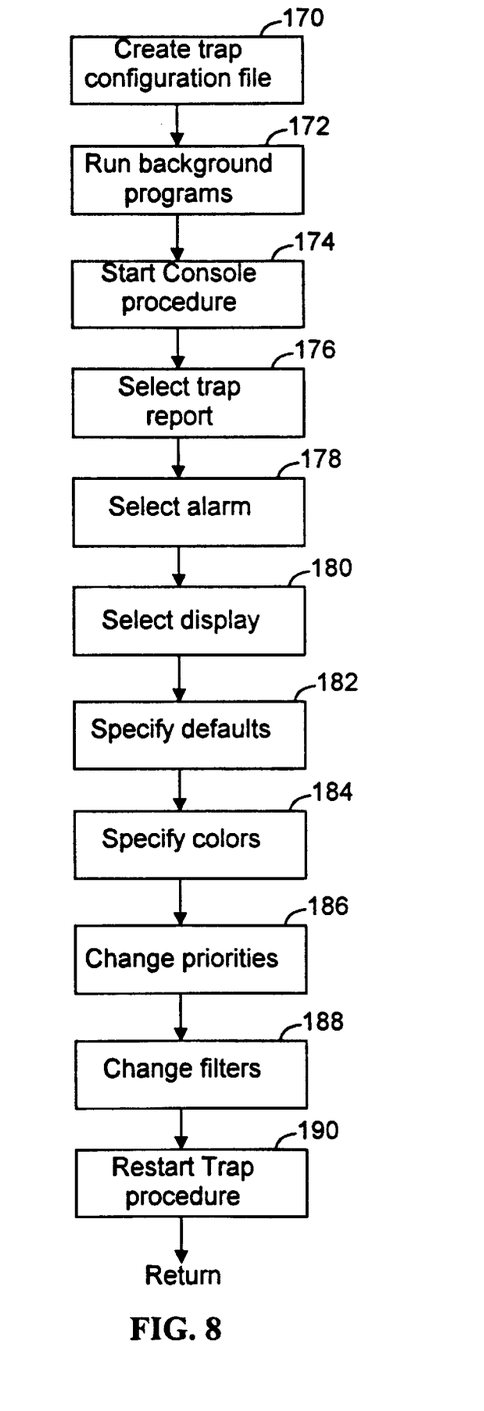
FIG. 8 is a flowchart of the procedure for selectively managing network elements according to a preferred embodiment of the present invention.

Reference is now made to FIG. 8, which shows steps that a network administrator or other user can perform to manage a network. The network administrator creates or accesses a trap configuration file 76 having entries for the traps, devices and enterprises (step 170). The Trap procedure 62 and Event Dispatcher procedure 64 are run in the background (step 172). The Console procedure 66 is started (step 174), whereby it registers with the Event Dispatcher procedure 64, informing the Event Dispatcher procedure 66 to send traps to it. The Console procedure 66 also displays a menu bar, which allows the network administrator to initiate the Trap Report procedure 70 (step 176), Alarm procedure 72 (step 178), Display procedure 74 (step 180), and Properties popup dialog box 82 (step 184).

The network administrator can initiate the Trap Report procedure 70 to receive trap reports, the Alarm procedure 72 to be notified by an alarm when a trap is logged, and the Display procedure 74 to view the color-coded glyphs 75 of the devices generating the traps.

The network administrator can specify the default priority and default filter in the network manager global configuration file 83 (step 182). The network administrator can also specify colors for the trap priorities in the network manager user specific configuration file 84 (step 184). The color selected for the HIGH priority should be immediately recognizable to the network administrator.

If, while the network manager 40 is managing the network 10, a large number of traps is being received, the network administrator can focus on the most important traps by changing the priorities of certain traps, devices, and enterprises in the trap configuration file 76 (step 186). If too many traps are being received from a particular enterprise or device, or if a specific trap is deemed at the moment to be unimportant, the network administrator can assign DISCARD filters to those traps, devices and enterprises in the trap configuration file 76 (step 188). After the trap configuration file 76 is modified, the trap procedure 62 is restarted (step 190).

Thus disclosed is an invention that provides great flexibility as to how a network can be managed. The invention allows a network administrator to focus on the most serious problems and give immediate attention to those problems. It allows the network administrator to decide which traps, devices and enterprises are important and which ones are not. By prioritizing and filtering the traps, the invention allows the network administrator to manage large numbers of traps in an easy, efficient and intelligent manner.

It is understood that various changes and modifications may be made without departing from the spirit and scope of the invention. The invention is not limited to the prioritization (HIGH, MEDIUM, LOW) and filtering (DISCARD) schemes described above. Additional or fewer priority levels and filters can be used. Although the present invention has been described with reference to the SNMP network management protocol, it is not limited to this particular protocol. Other network management schemes can be utilized as well. Moreover, the invention is not limited to the use of a Console procedure to perform the notification functions. Although the notification functions can be easily incorporated into the Console procedure, which performs other management tasks, they can be incorporated into any other procedure of the network manager. Or the notification functions can be performed by a separate procedure. Accordingly, the present invention is not limited to the precise embodiments described hereinabove. Instead, the invention is defined by the claims that follow.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

We claim:

1. A computer-implemented method of managing a network having a plurality of devices, comprising the steps of:

providing a hierarchical data structure having a plurality of levels representing trap filter and trap priority assignments, a first level representing trap filter and trap priority assignments associated with said devices, a second level representing trap filter and trap priority assignments associated with one or more enterprises, said first level having a higher precedence than said second level;

receiving a trap from one of said devices, said received trap having a corresponding device identifier and enterprise identifier;

for said received trap,
  traversing said hierarchical data structure for a highest precedent trap filter and trap priority assignment that corresponds to said received trap, and
  assigning said highest precedent trap filter and trap priority assignment to said received trap; and responding to said received trap in accordance with said trap filter and trap priority assignment.

2. The method of claim 1, said hierarchical data structure having a third level representing default trap filter and default trap priority assignments, said third level having a lowest precedence.

3. The method of claim 1, each said trap filter and trap priority assignments associated with said first level having one or more sublevels, each said sublevel representing a trap filter and trap priority assignment for a particular trap associated with said associated device of said associated first level, each said sublevel assignment having a higher precedence than said associated first level;

each said trap filter and trap priority assignments associated with said second level having one or more sublevels, each said sublevel representing a trap filter and trap priority assignment for a particular trap associated with said associated enterprise of said associated second level, each said sublevel assignment having a higher precedence than said associated second level.

4. A computer-implemented method of managing a network having a plurality of devices, comprising the steps of:

(a) providing a plurality of datums, each datum representing a trap filter and trap priority, each of a first subset of said datums associated with ones of a subset of said devices, each of a second subset of said datums associated with ones of a subset of enterprises, each of a third subset of said datums associated with a specific trap corresponding to a particular device, each of a fourth subset of said datums associated with a specific trap corresponding to a particular enterprise, each said specific trap having a trap identifier, a default datum representing a default trap filter and trap priority;

(b) receiving one or more traps from one or more of said devices, each of said received traps having a corresponding trap identifier, device identifier, and enterprise identifier;

(c) for each of said received traps,
    (i) identifying a trap filter and trap priority that is associated with said received trap's trap identifier and device,
    (ii) when no trap filter and priority are identified in step (i), identifying a trap filter and a trap priority that is associated with said received trap's device,
    (iii) when no trap filter and priority are identified in steps (i)–(ii), identifying a trap filter and trap priority that is associated with said received trap's trap identifier and enterprise,
    (iv) when no trap filter and priority are identified in steps (i)–(iii), identifying a trap filter and a trap priority that is associated with said received trap's enterprise, and
    (v) when no trap filter and priority are identified in steps (i)–(iv), identifying a corresponding default trap filter and priority; and (d) responding to each of said received traps in accordance with said identified trap filter and priority.

5. The method of claim 4, each of said datums having a value selected from the set consisting of (discard filter, no priority), (no filter, low priority), (no filter, medium priority), (no filter and high priority).

6. The method of claim 4, modifying one or more of said datums.

7. The method of claim 4, said step (d) further including the step of placing ones of said devices generating said received traps in a Pending state.

8. The method of claim 4, said step (d) further including the step of displaying one or more glyphs representing ones of said devices generating said received traps in colors that indicate said received trap's trap priority.

9. The method of claim 4, said step (d) further including the step of providing notification of each of said received traps.

10. A computer-implemented method for managing a network having a plurality of devices, comprising the steps of:

(a) providing a trap configuration file, said file having a plurality of entries, a first subset of said entries associated with select ones of said devices, each of said entries in said first subset including a datum representing a trap filter and trap priority for a corresponding one of said devices and including zero or more subentries, each subentry corresponding to a specified trap associated with said device and including a trap identifier and a datum representing a trap filter and trap priority, a second subset of said entries associated with one or more enterprises, each of said entries in said second subset including a trap filter and trap priority for a corresponding one of said enterprises and including zero or more subentries, each subentry corresponding to a specified trap associated with said enterprise and including a trap identifier and datum representing a trap filter and trap priority;

(b) providing a default trap filter and trap priority;

(c) receiving one or more traps, each of said received traps having a corresponding trap identifier, device identifier, and enterprise identifier;

(d) searching said trap configuration file for an appropriate trap filter and trap priority for each of said received traps, said search performed in accordance with a predefined search order, including performing the steps of:
    (1) searching first for a trap filter and trap priority associated with said received trap's device identifier and trap identifier;
    (2) when said search in said step (d)(1) is unsuccessful, searching second for a trap filter and trap priority associated with said received trap's device identifier;
    (3) when said search in said steps (d)(1)–(d)(2) are unsuccessful, searching third for a trap filter and trap priority associated with said received trap's enterprise identifier and trap identifier;

(4) when said search in said steps (d)(1)–(d)(3) are unsuccessful, searching fourth for a trap filter and trap priority associated with said received trap's enterprise identifier; and (5) when said search in said steps (d)(1)–(d)(4) are unsuccessful, searching lastly for said received trap's default trap filter and default trap priority;

(e) for each of said received traps, assigning said trap filter and trap priority from said search step; and (f) utilizing each of said received trap's trap filter and trap priority to respond to each of said received traps.

11. The method of claim 10, each of said datums having a value selected from the set consisting of (discard filter, no priority), (no filter, low priority), (no filter, medium priority), and (no filter, high priority).

12. The method of claim 10, further comprising the step of modifying one or more entries and one or more subentries of said trap configuration file.

13. The method of claim 10, further comprising the step of placing ones of said devices generating said received traps in a Pending state.

14. The method of claim 10, further comprising the step of displaying one or more glyphs representing ones of said devices generating said received traps in colors that indicate said received trap's trap priority.

15. The method of claim 10, further comprising the step of providing notification of each of said received traps.

16. A computer system for managing a plurality of network devices, said system comprising:

a memory for storing a trap received from one of said devices, the received trap having a corresponding device identifier and enterprise identifier, a hierarchical data structure having a plurality of levels representing trap filter and trap priority assignments, a first level representing trap filter and trap priority assignments associated with said devices, a second level representing trap filter and trap priority assignments associated with one or more enterprises, said first level having a higher precedence than said second level; and a trap procedure for responding to the received trap, said trap procedure including instructions to traverse said hierarchical data structure for a highest precedent trap filter and trap priority that corresponds to the received trap, assign said highest precedent trap filter and trap priority to the received trap, and respond to the received trap in accordance with said assigned trap filter and trap priority.

17. The system of claim 16, said hierarchical data structure having a third level representing default trap filter and default trap priority assignments, said third level having a lowest precedence.

18. The system of claim 16, each said trap filter and trap priority assignments associated with said first level having one or more sublevels, each said sublevel representing a trap filter and trap priority assignment for a particular trap associated with said associated device of said associated first level, each said sublevel assignment having a higher precedence than said associated first level;

each said trap filter and trap priority assignments associated with said second level having one or more sublevels, each said sublevel representing a trap filter and trap priority assignment for a particular trap associated with said associated enterprise of said associated second level, each said sublevel assignment having a higher precedence than said associated second level.

19. A computer system for managing a plurality of devices connected to a network, said system comprising:

a memory for storing one or more traps received from one or more of said devices, each of said received traps having a specified trap identifier, a device identifier, and an enterprise identifier, a plurality of datums, each datum representing a trap filter and trap priority, each of a first subset of said datums associated with ones of a subset of said devices, each of a second subset of said datums associated with ones of a subset of enterprises, each of a third subset of said datums associated with a specific trap corresponding to a particular device, each of a fourth subset of said datums associated with a specific trap corresponding to a particular enterprise, said specific trap having a trap identifier, a default datum representing a default trap filter and trap priority;

a trap procedure for processing each of said received traps, said trap procedure including instructions to receive each of said received traps, select a trap filter and trap priority for each of said received traps in accordance with a prescribed selection order that specifies the steps of:

(1) identifying first a trap filter and trap priority associated with said received trap's device and specified trap identifier, (2) when no trap filter and trap priority is found in step (1), selecting second a trap filter and trap priority associated with said received trap's device, (3) when no trap filter and trap priority is found in steps (1)–(2), selecting thirdly a trap filter and trap priority associated with said received trap's enterprise and specified trap identifier, (4) when no trap filter and trap priority is found in steps (1)–(3), selecting fourthly a trap filter and trap priority associated with said received trap's enterprise, and (5) when no trap filter and trap priority is found in steps (1)–(4), selecting lastly a default trap filter and trap priority;

an event dispatcher procedure for distributing each of said received traps to one or more procedures;

a console procedure for responding to each of said received traps, said console procedure including instructions to notify one or more users of each of said received traps;

wherein said computer system uses said trap procedure to receive each of said received traps, to assign a trap filter and trap priority to each of said received traps, and to transmit each of said traps to said event dispatcher procedure, said event dispatcher procedure distributes each of said received traps to said console procedure and to one or more other procedures, and said console procedure performs notification of each of said received traps.

20. The system of claim 19, each of said datums having a value selected from the set consisting of (discard filter, no priority), (no filter, low priority), (no filter, medium priority), and (no filter, high priority).

21. The system of claim 19, an editor for modifying one or more entries and one or more subentries of said trap configuration file.

22. The system of claim 19, said console procedure further including instructions to display one or more glyphs representing ones of said devices generating said received traps in colors that indicate said received trap's trap priority.

23. A computer readable storage medium for storing data for access by programs being executed on a data processing system, said medium comprising:

a trap received from one of said devices, the received trap having a corresponding device identifier and enterprise identifier;

a hierarchical data structure having a plurality of levels representing trap filter and trap priority assignments, a first level representing trap filter and trap priority assignments associated with said devices, a second level representing trap filter and trap priority assignments associated with one or more enterprises, said first level having a higher precedence than said second level; and a trap procedure for responding to the received trap, said trap procedure including instructions to traverse said hierarchical data structure for a highest precedent trap filter and trap priority that corresponds to the received trap, assign said highest precedent trap filter and trap priority to the received trap, and respond to the received trap in accordance with said assigned trap filter and trap priority.

24. The medium of claim 23, said hierarchical data structure having a third level representing default trap filter and default trap priority assignments, said third level having a lowest precedence.

25. The medium of claim 23, each said trap filter and trap priority assignments associated with said first level having one or more sublevels, each said sublevel representing a trap filter and trap priority assignment for a particular trap associated with said associated device of said associated first level, each said sublevel assignment having a higher precedence than said associated first level;

each said trap filter and trap priority assignments associated with said second level having one or more sublevels, each said sublevel representing a trap filter and trap priority assignment for a particular trap associated with said associated enterprise of said associated second level, each said sublevel assignment having a higher precedence than said associated second level.

26. A computer readable storage medium for storing data for access by programs being executed on a data processing system, said medium comprising:

one or more traps received from one or more of said devices, each of said received traps having a specified trap identifier, a device identifier, and an enterprise identifier;

a plurality of datums, each datum representing a trap filter and trap priority, each of a first subset of said datums associated with ones of a subset of said devices, each of a second subset of said datums associated with ones of a subset of enterprises, each of a third subset of said datums associated with a specific trap corresponding to a particular device, each of a fourth subset of said datums associated with a specific trap corresponding to a particular enterprise, said specific trap having a trap identifier, a default datum representing a default trap filter and trap priority;

a trap procedure for processing each of said received traps, said trap procedure including instructions to receive each of said received traps, and select a trap filter and trap priority for each of said received traps in accordance with a prescribed selection order that specifies the steps of:

(1) selecting first a trap filter and trap priority associated with said received trap's associated device and specified trap identifier, (2) when said selection step (1) is unsuccessful, selecting second a trap filter and trap priority associated with said received trap's device, (3) when said selection steps (1)–(2) are unsuccessful, selecting third a trap filter and trap priority associated with said received trap's associated enterprise and specified trap identifier, (4) when said selection steps (1)–(3) are unsuccessful, selecting fourth a trap filter and trap priority associated with said received trap's enterprise, and (5) when said selection steps (1)–(4) are unsuccessful, selecting last a default trap filter and trap priority;

an event dispatcher procedure for distributing each of said received traps to said console procedure;

a console procedure for responding to each of said received traps, said console procedure including instructions to notify one or more users of each of said received traps.

27. The medium of claim 26, each of said datums having a value selected from the set consisting of (discard filter, no priority), (no filter, low priority), (no filter, medium priority), and (no filter, high priority).

28. The medium of claim 26, an editor for modifying one or more entries and one or more subentries of said trap configuration file.

29. The medium of claim 26, said console procedure further including instructions to display one or more glyphs representing ones of said devices generating said received traps in colors that indicate said received trap's trap priority.

* * * * *